(12) United States Patent
Yagihashi

(10) Patent No.: US 6,340,735 B1
(45) Date of Patent: Jan. 22, 2002

(54) COATING SOLUTION AND METHOD FOR FORMING DIELECTRIC FILM

(75) Inventor: Fujio Yagihashi, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/541,084

(22) Filed: Mar. 31, 2000

(30) Foreign Application Priority Data

Mar. 31, 1999 (JP) .......................................... 11-091325

(51) Int. Cl.⁷ ............................................... C08G 77/06
(52) U.S. Cl. ........................... 528/37; 528/14; 528/21; 528/43
(58) Field of Search ............................... 528/21, 37, 43, 528/14; 427/387

(56) References Cited

U.S. PATENT DOCUMENTS

| | | | |
|---|---|---|---|
| 4,600,685 A | * | 7/1986 | Kitakohji et al. |
| 4,756,977 A | | 7/1988 | Haluska et al. |
| 4,822,697 A | | 4/1989 | Haluska et al. |
| 4,898,907 A | | 2/1990 | Haluska et al. |
| 5,179,185 A | * | 1/1993 | Yamamoto et al. |
| 5,183,846 A | * | 2/1993 | Aiba et al. |
| 5,380,567 A | | 1/1995 | Haluska |
| 5,389,492 A | * | 2/1995 | Kokubo et al. |
| 5,416,190 A | | 5/1995 | Mine et al. |
| 5,486,564 A | | 1/1996 | Mine et al. |

FOREIGN PATENT DOCUMENTS

| | | |
|---|---|---|
| EP | 516 144 A1 * | 12/1992 |
| JP | 6-42477 | 6/1994 |
| JP | 6-157760 | 6/1994 |

OTHER PUBLICATIONS

"Contemporary Polymer Chemistry, Second Edition", Allcock et al., 1990, Prentice Hall, Engelwood Cliffs, NJ 07632.*

* cited by examiner

Primary Examiner—Robert Dawson
Assistant Examiner—Marc S. Zimmer

(57) ABSTRACT

A coating solution of a poly(phenylsilsesquioxane) ladder polymer having a weight average molecular weight of 4,000–100,000 in a suitable solvent is spin coated and heated to form a dense dielectric film having a low dielectric constant.

6 Claims, No Drawings

COATING SOLUTION AND METHOD FOR FORMING DIELECTRIC FILM

This invention relates to a coating solution capable of forming a dense dielectric film having improved crack resistance and heat resistance and a method for forming such a dielectric film.

BACKGROUND OF THE INVENTION

As LSI elements are increased in speed and integration, more attention is paid to the delay of signals caused by the capacitance between wiring lines or between layers. As a general rule, the wiring delay is in proportion to the square root of the dielectric constant of insulating material. Reducing the dielectric constant of the interlayer dielectric is effective for reducing the wiring delay.

A variety of materials are now used as the dielectric film, but they have their own problem. It is urgently required to solve the problems, which are briefly described below.

First, the currently used interlayer dielectrics include silicon dioxide film by CVD method, and boro-phospho-silicate glass (BPSG) doped with boron, phosphorus, etc. These interlayer dielectrics based on $SiO_2$ have a dielectric constant of about 4.

One known method for reducing the dielectric constant of such an interlayer dielectric is to admix fluoride gas during formation of an oxide film by the CVD method, to thereby form a SiOF film which is used as the interlayer dielectric film. The silicon oxide fluoride film is intended to reduce the dielectric constant by coupling the oxide film-constructing silicon atoms with fluorine atoms having a low polarizability. The interlayer dielectric film in the form of an SiOF film, however, has the drawback that it becomes more hygroscopic as the fluorine content increases. Because of a limit on the fluorine content, the dielectric constant can be reduced to about 3.5 at the best.

The multilayer wiring technology is requisite for the fabrication of VLSIs which are seeking for higher accumulation and higher functions. In the microfabrication process, steps are formed on the substrate when wiring patterns and dielectric films are formed.

The planarization method is considered important for solving this problem. As the planarization method, a spin-on-glass (SOG) method is generally used in practice. The SOG method uses a silicon resin soluble in an organic solvent. The silicon resin solution is spin coated onto a substrate surface to bury irregularities at steps, and heat treated to form a dielectric film for providing a planar surface.

The coating solutions of alkoxysilanes such as tetraethoxysilane and triethoxysilane and halogenated silanes such as trichlorosilane are known as inorganic SOG. Since these silanes do not possess organic groups directly attached to silicon atoms, heat curing results in dielectric films of completely inorganic nature which have reliable characteristics. A number of studies have been made on the inorganic SOG.

For example, JP-A 6-42477 discloses a method for covering an electronic device with a silica thin film involving the steps of applying a solution of a hydrogensilsesquioxane resin in a solvent onto a substrate, evaporating the solvent, and heat treating at a temperature of 150 to 1,000° C. to convert the resin to ceramic silica. However, the hydrogensilsesquioxane resin usually contains a non-negligible amount of volatile component. When the resin film is exposed to high temperature, there arises the problems including the thinning of the film and internal stresses induced within the film. Additionally, the volatile component scatters to contaminate the surrounding equipment.

To eliminate these problems, it was proposed to remove a low-molecular weight fraction from the hydrogensilsesquioxane resin. For example, JP-A 6-157760 discloses to add a solvent to a hydrogensilsesquioxane resin as synthesized to remove a low-molecular weight fraction. However, when the hydrogensilsesquioxane resin from which a low-molecular weight fraction has been removed by the above method is applied to a substrate, the resulting film lacks some planarity. For application to electronic devices of multilayer structure, the same resin is inferior in the coverage of steps in substrates. The resin is thus not satisfactory.

Further, inorganic SOG films generally have a dielectric constant as high as about 4.0 because of a relatively high content of silanol groups which are polar groups. It is thus considered to use instead organic SOG films and organic dielectric films having a low dielectric constant as the interlayer dielectric for very fine LSIs.

The organic SOG films are formed by curing solutions of silanes or siloxanes containing organic components such as methyl and phenyl groups. Since organic components are left in the films after heat curing, the films have a relatively low dielectric constant of about 3.

The organic SOG films are formed by spin coating the solution, heat curing the coating and repeating the coating and curing steps several times. Undesirably, this production process takes a long time and results in a low yield. Since the majority of the solution is wasted during spin coating, the cost increases. The films have a dielectric constant of about 3.5 which is unsatisfactory.

Another known method for reducing the dielectric constant of interlayer dielectric is to form fine pores within the film. For example, triphenylsilanol is added to and reacted with the SOG solution, which is applied to a semiconductor wafer and heat treated for silylation of the SOG. Further heating completes an interlayer dielectric film. Since bubbles are generated in the spin-coated film during the SOG silylation step, pores are eventually left in the interlayer dielectric film. The porous interlayer dielectric film thus formed has a dielectric constant of about 2.3, though the dielectric constant varies with the proportion of pores. However, the moisture absorption and other problems of the porous film prohibit its application to customary semiconductor devices and electronic circuit parts.

SUMMARY OF THE INVENTION

Therefore, an object of the invention is to provide a novel and improved coating solution capable of forming a dense dielectric film having improved crack resistance and heat resistance and a low dielectric constant. Another object of the invention is to provide a method for forming such a dielectric film.

It has been found that by spin coating a coating solution of a poly(phenylsilsesquioxane) ladder polymer having a relatively low molecular weight as demonstrated by a weight average molecular weight of 4,000 to 100,000 in a solvent, there is obtained a coating having a high planarity and uniformity by virtue of the high solubility of the ladder polymer in the solvent. By heating the coating, it is converted into a tough thin film having crack resistance, heat resistance, water resistance, adhesion and strength as well as a low dielectric constant. The invention is predicated on this finding.

The invention provides a dielectric film-forming coating solution comprising a poly(phenylsilsesquioxane) ladder polymer having a weight average molecular weight of 4,000 to 100,000.

In another aspect, the invention provides a method for forming a dielectric film, comprising the steps of applying the coating solution defined above and heating the coating at a temperature of 200 to 1,000° C.

DESCRIPTION OF THE PREFERRED EMBODIMENT

The coating solution of the invention contains a poly (phenylsilsesquioxane) ladder polymer having a weight average molecular weight of 4,000 to 100,000 as a main component.

From the past, poly(phenylsilsesquioxane) resins are utilized as coating materials, sealants and interlayer dielectrics on account of their heat resistance and electrical insulation. These resins are generally synthesized by hydrolyzing silanes having hydrolyzable groups such as phenyltrichlorosilane and phenyltrialkoxysilanes. The thus obtained resins have a structure in which siloxane chains are randomly bonded.

The randomly bonded poly(phenylsilsesquioxane) resins are in an insufficient condensed state, have a considerable amount of silanol groups or alkoxy groups left on silicon atoms, and are soluble in organic solvents. If condensation is promoted in order to convert the resin into a higher molecular weight one, the resin undesirably turns to a solvent-insoluble gel through three-dimensional crosslinking.

However, on account of trifunctionality, poly (phenylsilsesquioxane) can form a ladder structure as shown by the following formula (2), which is known as "ladder polymer." Since the ladder polymer has a linear structure, it is soluble in organic solvents despite a high degree of condensation.

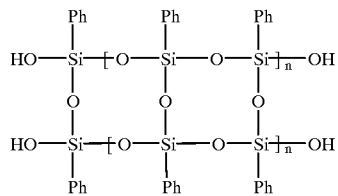

(2)

In the formula, Ph is phenyl and n is a positive integer.

By way of information, the poly(phenylsilsesquioxane) ladder polymers known in the art, in the high molecular weight region, are soluble in a limited number of solvents such as benzene and tetrahydrofuran, but little soluble or insoluble in those solvents commonly used in spin coating, such as propylene glycol monomethyl ether acetate, ethyl lactate, cyclohexanone, diethylene glycol dimethyl ether, and ethyl cellosolve acetate. They are thus inadequate for spin coating.

For example, Brown et al. of General Electric Company reported in 1960 that a ladder polymer can be synthesized by hydrolyzing phenyltrichlorosilane to form a prepolymer and heat condensing the prepolymer in a high-boiling solvent in the presence of potassium hydroxide condensation catalyst. See J. Am. Chem. Soc., 82, 6194 (1960). The ladder polymer synthesized by the method of Brown et al. is soluble in benzene and tetrahydrofuran, but little soluble in toluene and the above-mentioned solvents including propylene glycol monomethyl ether acetate.

In contrast, polymers having a weight average molecular weight of 4,000 to 100,000, preferably 4,500 to 50,000, and more preferably 5,000 to 25,000 according to the invention are soluble in such solvents as propylene glycol monomethyl ether acetate, have a minimal amount of polar groups such as silanol groups, and can form a dense insulating film having a low dielectric constant. A coating solution of the low molecular weight ladder polymer according to the invention is useful when a variety of substrates including electronic devices are provided with coatings of soluble silicon resins, to form protective or interlayer dielectric films.

The ladder polymer having a weight average molecular weight of 4,000 to 100,000 according to the invention may be prepared by any desired methods. For example, a ladder polymer synthesized by the method of Brown et al. has a portion which is soluble in such a solvent as propylene glycol monomethyl ether acetate. Then the solvent is added to the ladder polymer of Brown, insolubles are filtered off, and the solvent is distilled off. Alternatively, a solvent in which the polymer is substantially insoluble, such as hexane or methanol is added to the polymer, and the resultant precipitate is filtered off. In either way, a soluble, low molecular weight poly(phenylsilsesquioxane) ladder polymer is obtainable. Unfortunately, these procedures are very inefficient.

It is then recommended to produce the low molecular weight ladder polymer by starting with 1,3,5,7-tetraphenylcyclotetrasiloxane-1,3,5,7-tetraol of the following formula (1) and subjecting it to dehydration condensation in a solvent.

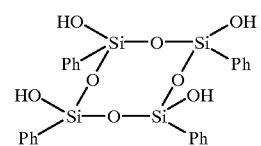

(1)

In formula (1), Ph is phenyl. With this process, dehydration condensation takes place in the solvent under very moderate conditions whereby the desired ladder polymer is effectively synthesized.

The polymers synthesized by this process generally have a weight average molecular weight of 4,000 to 100,000 although the molecular weight varies with reaction conditions. The polymers are soluble not only in those solvents in which high molecular weight phenylsilsesquioxane ladder polymers are soluble, such as benzene and tetrahydrofuran, but also in those solvents in which the high molecular weight polymers are little soluble, such as propylene glycol monomethyl ether acetate, ethyl lactate, cyclohexanone, diethylene glycol dimethyl ether, and ethyl cellosolve acetate.

The above process is described in further detail. The synthesis of 1,3,5,7-tetraphenylcyclotetrasiloxane-1,3,5,7-tetraol used as the starting reactant is reported in Brown et al., J. Am. Chem. Soc., 87, 4317 (1965). The experimental procedure described in the article is repeated, and the tetraol reactant can be isolated as crystalline powder. The tetraol reactant is dissolved in a solvent to form a solution, which is agitated preferably after a base is added thereto. Dehydration condensation takes place moderately, forming a ladder structured silicone resin of formula (2), poly (phenylsilsesquioxane).

The dehydration condensation reaction may use any desired one of the solvents in which the tetraol reactant is soluble. Exemplary solvents include methanol, ethanol, 1-propanol, 2-propanol, 2-methyl-2-propanol, 1-butanol, 2-butanol, acetone, 2-butanone, 2-hexanone, tetrahydrofuran, dioxane, ethyl acetate, 1-butylacetic acid, isobutylacetic acid, acetonitrile, N,N-dimethylformamide, N,N-dimethylacetamide, and dimethylsulfoxide. Desirable as the solvent used in the dehydration condensation reaction are those solvents in which the cyclic tetramer reactant is soluble, but the ladder polymer resulting from condensation is substantially insoluble, for example, acetone, 2-butanone, dioxane, ethyl acetate, acetonitrile, tetrahydrofuran, and N,N-dimethylacetamide.

For the dehydration condensation reaction to proceed, the solution is agitated at room temperature. It is preferred to add an extremely minor amount of a base to the solution. Adding 100 ppm of the base is usually sufficient. If the reaction system is acidic for the reason that the reactant incidentally contains an acidic substance, the base is necessary in a sufficient amount to neutralize. For most cases, the base is used in an amount of 10 to 5,000 ppm, though this range is not critical. If the amount of the base added is excessive, part of the cyclic tetramer reactant itself can be decomposed to form a gel which is insoluble in the solvent.

The base used herein may be any desired basic substance. Exemplary bases include alkalis such as sodium hydroxide, potassium hydroxide, ammonium hydroxide, and N,N,N,N-tetramethylammonium hydroxide, and amines such as triethylamine, tributylamine, dimethylaniline, di-isopropylamine, N,N-diethylcyclohexylamine, 1,4-diazabicyclo[2.2.2]octane, 1,8-diazabicyclo[5.4.0]undec-7-ene, and 2,5-diazabicyclo[2.2.1]heptane.

While the reactant is initially kept dissolved in the solvent, the silicone resin being formed gradually increases its molecular weight and decreases its solubility whereby a precipitate settles out. The time required for precipitation usually ranges from several minutes to several hours though it varies with reaction conditions. To drive the reaction to completion, the reaction is preferably continued for about 24 to 100 hours. The end resin is separated by filtration. It is noted that no precipitate forms when a certain solvent is used. In this case, after the lapse of a sufficient reaction time, a second solvent in which the resin is insoluble, such as methanol or hexane is added to the reaction solution to insolubilize the resin, which can be separated by filtration. The silicone resin is isolated in a substantially quantitative yield.

The coating solution of the invention is obtained by dissolving the low molecular weight poly(phenylsilsesquioxane) ladder polymer in an organic solvent. The solvent is selected in accordance with the desired application. The preferred, non-limiting examples of the solvent include propylene glycol monomethyl ether acetate, ethyl lactate, cyclohexanone, diethylene glycol dimethyl ether, and ethyl cellosolve acetate. The coating solutions in these solvents have the advantage that spin coating the solution onto a silicon substrate can form a thin coating which is unsusceptible to striation and has a very high flatness.

No particular limit is imposed on the concentration of the ladder polymer in the coating solution of the invention although a concentration of 1 to 50% by weight, especially 5 to 30% by weight is typically employed. By controlling the concentration of the coating solution, the number of revolutions and other parameters, a thin coating can be formed to a desired thickness. The thin coating thus formed does not crack when heated to evaporate the solvent.

The method of the invention generally involves applying the coating solution onto a substrate, typically silicon substrate, to form a coating, optionally drying the coating, and heating the coating at a temperature of 200 to 1,000° C., desirably 300 to 500° C. Heating promotes partial crosslinking, forming a dielectric film having a high strength. The heating time is usually about 10 minutes to about 3 hours, desirably about 20 minutes to about one hour.

The dielectric film generally has a thickness of 0.1 to 10 μm, especially 0.5 to 2 μm although the thickness is selected in accordance with the desired application.

For instance, the coating solution is spin coated onto a silicon wafer having an aluminum sputtered surface and heat cured at 400° C. for 2 hours to form a dielectric film. With an aluminum electrode placed on the dielectric film, the film is examined for C-V characteristics. The dielectric film has a dielectric constant of about 2.0 to about 2.6.

EXAMPLE

Examples of the invention are given below by way of illustration and not by way of limitation.

Preparation Example 1

In 300 ml of acetone was dissolved 6.0 g of 1,3,5,7-tetraphenylcyclotetrasiloxane-1,3,5,7-tetraol crystals. With 0.1 g of triethylamine added, the solution was agitated at room temperature. About 10 minutes later, the solution which had been homogeneous turned white turbid. About 5 hours later, a viscous substance formed which impeded agitation. In this state, the solution was allowed to stand for 48 hours whereupon the precipitated matter was found to be solidified and tack-free. The solid was physically ground into a powder and collected by filtration. The powder was washed with acetone and dried in vacuum. There was obtained 5.23 g of a powdery solid residue, which corresponded to a yield of 93% on the assumption that dehydration condensation had proceeded to completion. On analysis by gel permeation chromatography, this compound had a weight average molecular weight (Mw) of about 9,230 and a number average molecular weight (Mn) of about 5,161, calculated on the basis of polystyrene, with a dispersity (Mw/Mn) being 1.79. In an IR absorption spectrum of the compound, a peak due to absorption of Si-OH appeared at 3,450 $cm^{-1}$ and split peaks due to absorption of siloxane bond appeared at 1,043 $cm^{-1}$ and 1,132 $cm^{-1}$, which indicated that the polymer had a ladder structure.

Example 1

Whether the polymer synthesized in Preparation Example 1 was soluble in various solvents was examined by adding 2 grams of the polymer to the solvent and agitating the mixture (or solution) for 12 hours. The polymer was rated "Soluble" when the solution was homogeneous, "Fair" when the polymer was substantially dissolved though the solution was turbid, and "NO" when a solid matter was left. The results are shown in Table 1.

TABLE 1

| Solution weight | 40 g | 30 g | 20 g |
|---|---|---|---|
| Propylene glycol monomethyl ether acetate | Soluble | Soluble | Soluble |
| Ethyl cellosolve acetate | Soluble | Soluble | Soluble |
| Diglyme | Soluble | Soluble | Soluble |

TABLE 1-continued

| Solution weight | 40 g | 30 g | 20 g |
|---|---|---|---|
| Ethyl lactate | Fair | Fair | NO |
| Cyclohexanone | Soluble | Fair | Fair |

Example 2

Propylene glycol monomethyl ether acetate was added to 20 g of the polymer synthesized in Preparation Example 1 to a total weight of 100 g. This was agitated at room temperature, obtaining a homogeneous colorless solution. The solution was passed through a 0.2-μm membrane filter. The filtered solution was spin coated onto a 8-inch silicon wafer at a different rpm and kept at 100° C. for 90 seconds to form a thin film. The thin film was measured for thickness at 19 points along straight lines. An average of the measurements and a difference between maximum and minimum thicknesses were calculated, with the results shown in Table 2.

TABLE 2

| rpm | Average thickness (Å) | Difference between max and min thickness (Å) |
|---|---|---|
| 2000 | 8386.8 | 67 |
| 2500 | 7503.5 | 59 |
| 3000 | 6853.6 | 168 |
| 4000 | 5939.3 | 64 |

Example 3

Onto a silicon wafer having metallic aluminum deposited on a surface by sputtering, the coating solution prepared in Example 2 was spin coated, forming a thin coating having an average thickness of 8,350 Å. The coating was heat cured at 400° C. for one hour to form a dielectric film having a thickness of 8,120 Å. The C-V characteristics of the dielectric film were measured, from which a dielectric constant of 2.3 was calculated.

It is demonstrated that dense dielectric films having good crack resistance and heat resistance and a low dielectric constant are formed according to the invention.

Japanese Patent Application No. 11-091325 is incorporated herein by reference.

Reasonable modifications and variations are possible from the foregoing disclosure without departing from either the spirit or scope of the present invention as defined by the claims.

What is claimed is:

1. A process for the preparation of a dielectric film-forming coating solution comprising a poly(phenylsilsesquioxane) ladder polymer having a weight average molecular weight of 4,000 to 100,000 which comprises dehydrating a 1,3,5,7-tetraphenylcyclotetrasiloxane-1,3,5,7-tetraol of the following formula (1):

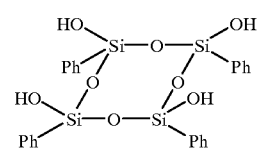

(1)

wherein Ph is phenyl, in a solvent.

2. The process of claim 1, wherein the solvent is selected from the group consisting of acetone, 2-butanone, dioxane, ethyl acetate, acetonitrile, tetrahydrofuran, and N,N-dimethylacetamide.

3. The process of claim 1, conducted in the presence of a base in an amount of 10 to 5,000 ppm.

4. The process of claim 1, wherein the dehydration reaction is conducted with agitation at room temperature.

5. The process of claim 1, wherein the dehydration reaction is carried our for about 24 to 100 hours.

6. The process of claim 3, wherein the base is a member selected from the group consisting of sodium hydroxide, potassium hydroxide, ammonium hydroxide, N,N,N,N-tertramethylammonium hydroxide, triethylamine, tributylamine, dimethylaniline, di-isopropylamine, N,N-diethylcyclohexylamine, 4,4-diazabicyclo[2.2.2]octane, 1,8-diazabicyclo[5.4.0]undec-7-ene, and 2,5-diazabicyclo[2.2.1]heptane.

* * * * *